US010828768B2

United States Patent
Brogårdh et al.

(10) Patent No.: US 10,828,768 B2
(45) Date of Patent: Nov. 10, 2020

(54) COMPACT ROBOT INSTALLATION

(71) Applicant: ABB Schweiz AG, Baden (CH)

(72) Inventors: Torgny Brogårdh, Västerås (SE);
Johan Ernlund, Västerås (SE)

(73) Assignee: ABB Schweiz AG, Baden (CH)

( * ) Notice: Subject to any disclaimer, the term of this patent is extended or adjusted under 35 U.S.C. 154(b) by 361 days.

(21) Appl. No.: 15/109,042

(22) PCT Filed: Feb. 27, 2014

(86) PCT No.: PCT/EP2014/053791
§ 371 (c)(1),
(2) Date: Jun. 29, 2016

(87) PCT Pub. No.: WO2015/127971
PCT Pub. Date: Sep. 3, 2015

(65) Prior Publication Data
US 2016/0332295 A1    Nov. 17, 2016

(51) Int. Cl.
*B25J 9/02* (2006.01)
*B25J 9/00* (2006.01)

(52) U.S. Cl.
CPC ............ *B25J 9/0051* (2013.01); *B25J 9/0084* (2013.01); *B25J 9/0048* (2013.01)

(58) Field of Classification Search
CPC ....... B25J 9/0051; B25J 9/0084; B25J 9/0048
See application file for complete search history.

(56) References Cited

U.S. PATENT DOCUMENTS

| 7,188,544 | B2 | 3/2007 | Persson et al. | |
| 2004/0103739 | A1* | 6/2004 | Brogardh | B23Q 1/5462 |
| | | | | 74/490.01 |
| 2005/0172750 | A1* | 8/2005 | Kock | B25J 9/107 |
| | | | | 74/490.01 |
| 2013/0189063 | A1* | 7/2013 | Brogardh | B25J 17/02 |
| | | | | 414/589 |
| 2014/0230594 | A1* | 8/2014 | De Bie | B25J 18/00 |
| | | | | 74/490.01 |
| 2016/0089776 | A1* | 3/2016 | Brogardh | B25J 9/0072 |
| | | | | 414/744.5 |

FOREIGN PATENT DOCUMENTS

| WO | 03066289 A1 | 8/2003 | |
| WO | 2012031635 A1 | 3/2012 | |
| WO | WO-2012031954 A1 * | 3/2012 | ......... B25J 17/0266 |

OTHER PUBLICATIONS

International Search Report and Written Opinion of the International Searching Authority Application No. PCT/EP2014/053791 Completed: Oct. 24, 2014; dated Nov. 3, 2014 9 pages.

* cited by examiner

*Primary Examiner* — Randell J Krug
(74) *Attorney, Agent, or Firm* — Whitmyer IP Group LLC

(57) ABSTRACT

A robot installation includes a first robot and a second robot. The first robot is attached to a fixed position in relation to the second robot such that the second robot lies within a reach of at least one drive arm of the first robot.

14 Claims, 3 Drawing Sheets

COMPACT ROBOT INSTALLATION

TECHNICAL FIELD

The present invention relates to mounting of parallel kinematics robots in relation to each other.

BACKGROUND

Parallel kinematics robots comprise a plurality of drive arms each connected, directly or via a gearbox, to a respective shaft of a servo motor at one end. At the opposite end each drive arm is connected to one or more rods transmitting the rotating movement of the drive arms to a respective movement of an end effector. The servo motors and the respective drive arms work in parallel in the sense that manipulation of one drive arm does not affect the position of the remaining drive arms.

A delta robot is one well known type of parallel kinematics robot that can comprise three drive arms. Each drive arm is connected to an end effector with two rods having a ball joint at each end. The drive arms rotate about respective servo motor axes, the servo motors being arranged symmetrically such that their axes intersect at 60 degrees angles. U.S. Pat. No. 7,188,544 discloses one type of a delta robot comprising three drive arms. Delta robots can also comprise four or more drive arms.

WO200366289 discloses other and less well known types of parallel kinematics robots comprising three or more drive arms. The robots according to WO200366289 differ from delta robots in that the rotational axes of the drive arms are parallel, and in many embodiments the drive arms even have one common rotational axis.

Conventionally, when two or more parallel kinematics robots are installed at a robot installation, the robots are attached to fixed positions in relation to each other such that the drive arms of one robot can never reach and thereby collide with the remaining robots. This is because it is not considered desirable to limit the work area of a robot with external obstacles. Instead, all the drive arms are enabled to rotate within the constraints defined only by the robot itself. Even though a great advantage in terms of space occupied is achieved if two robots are installed close to each other, doing so has not been considered feasible because of the caused limitations to the work areas of the robots.

SUMMARY

One object of the invention is to provide a robot installation which allows to install two robots close to each other and still keep the sizes of the respective work areas acceptable.

These objects are achieved by the device according to appended claim 1.

The invention is based on the realization that certain types of parallel kinematics robots are better adapted to be installed close to each other than others. Especially, robots in which the drive arms are arranged in an asymmetrical manner, and in which the drive arms rotate about parallel axes, the work area remains relatively large even when the rotation of one of the drive arms is strongly limited.

According to a first aspect of the invention, there is provided a robot installation comprising a first robot and a second robot. Each of the robots comprises a first shaft and a second shaft extending in a first direction from respective actuators, a third shaft extending in a second direction form a respective actuator, the second direction being opposite to the first direction, a frame defining fixed positions of the first, second and third shafts in relation to each other, a first drive arm attached to the first shaft, a second drive arm attached to the second shaft, and a third drive arm attached to the third shaft, wherein the first robot is attached to a fixed position in relation to the second robot such that the second robot lies within a reach of at least one drive arm of the first robot.

According to one embodiment of the invention, the first and the second robots are identical.

According to one embodiment of the invention, the robot installation comprises at least three robots, such as at least four, five, six or eight robots, each robot being attached to a fixed position in relation to the remaining robots such that each robot lies within a reach of at least one drive arm of the remaining robots.

According to one embodiment of the invention, the third drive arm is not perpendicular to the third shaft.

According to one embodiment of the invention, the third drive arm is inclined by 45 degrees in relation to the third shaft.

According to one embodiment of the invention, the first robot is attached to a fixed position in relation to the second robot such that the second robot lies within a reach of the third drive arm of the first robot.

According to one embodiment of the invention, the first robot is attached to a fixed position in relation to the second robot such that the frame or at least one drive arm of the second robot lies within a reach of at least one drive arm of the first robot.

According to one embodiment of the invention, the first robot is attached to a fixed position in relation to the second robot such that the frame or at least one drive arm of the second robot lies within a reach of the third drive arm of the first robot.

BRIEF DESCRIPTION OF THE DRAWINGS

The invention will be explained in greater detail with reference to the accompanying drawings, wherein.

DETAILED DESCRIPTION

Figure 1A:
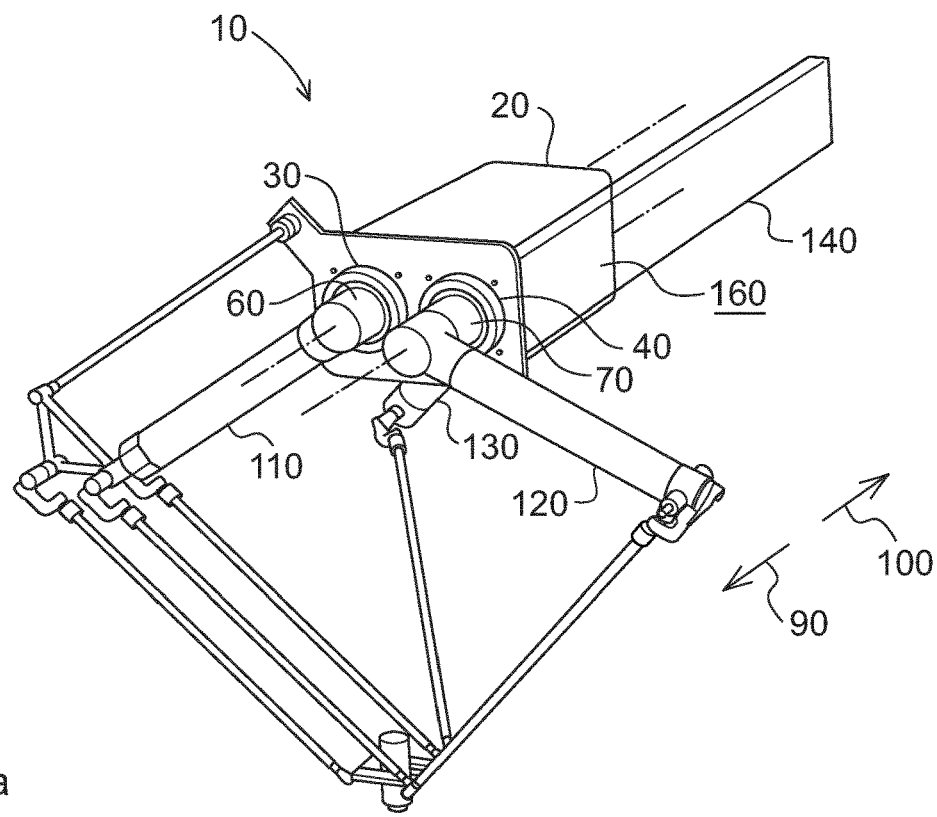
FIGS. 1a-1b show one embodiment of a robot that can be used with advantage in the context of the present invention.
Figure 1B:
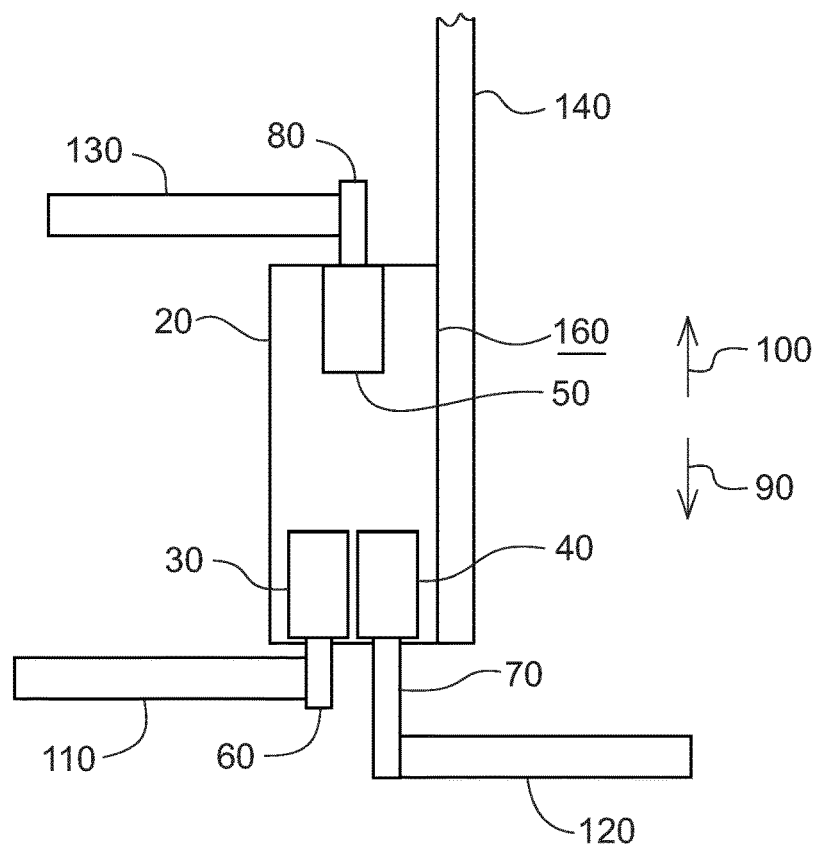

Referring to FIGS. 1a and 1b, a parallel kinematics robot 10 which is especially suitable to be applied in the context of the present invention comprises a frame 20 to which a first, second and third actuators 30, 40, 50 in the form of servo motors are fixedly attached. First and second shafts 60, 70 extend in a first direction 90 from the first and second actuators 30, 40, respectively, and a third shaft 80 extends in a second direction 100 form the third actuator 50. The second direction 100 is opposite to the first direction 90. A first drive arm 110 is attached to the first shaft 60, a second drive arm 120 is attached to the second shaft 70, and a third drive arm 130 attached to the third shaft 80, each drive arm 110, 120, 130 rotating along with the respective shaft 60, 70, 80 about a respective rotation axis.

The robot 10 according to FIG. 1 reaches a relatively large work area even when the rotation of the third drive arm 130 is strongly limited. For example, the rotation of the third drive arm 130 can be limited to 180 degrees such that it never crosses its rotational axis in the direction show in FIG. 1*b*. This in its turn means that a first frame surface 160 opposite to the third drive arm 130 becomes an ideal surface for attaching the robot 10 to an external obstacle. For example, a beam 140 extending from the frame 20 in the second direction 100 can be attached directly to the first frame surface 160 without any practical limitation to the work area of the robot 10.

Figure 2:
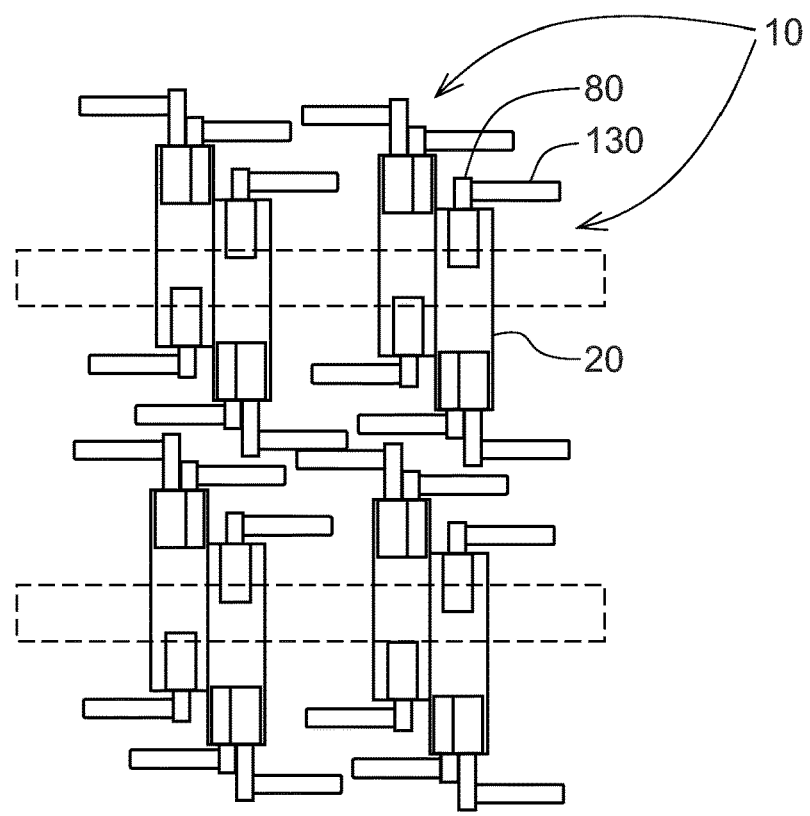
FIG. 2 shows one embodiment of the invention.

Obviously, instead of the beam 140 of FIG. 1, any external obstacle may extend from the first frame surface 160 in the second direction 100 without severely limiting the work area of the robot 10. According to the present invention the external obstacle is another robot 10. Referring to FIG. 2, according to one embodiment of the invention eight identical robots 10 are installed close to each other. The eight robots 10 form four pairs, and within each pair the robots 10 are mutually within the reach of the other robot 10. To be more precise, the third drive arm 130 of each robot 10 collides with the frame 20 of the neighbouring robot 10 when the respective third shaft 80 is rotated far enough. It goes without saying that such collision shall be prohibited in a real application by controlling the movements of the robots 10 appropriately, but for the purpose of defining the present invention it is essential that one robot 10 is physically within the reach of another robot 10. In the present case "being within the reach of another robot" implies that the third drive arm 130 of a first robot 10 collides with a second robot 10 when the third shaft 80 of the first robot 10 is attempted to rotate about a full circle. Furthermore, when considering whether one robot 10 is within the reach of another robot 10, in the context of the present invention any physical obstacles preventing a collision between the two robots 10 shall be omitted.

The dotted lines in FIG. 2 represent possible positions of fixtures to which the robots 10 are attached. The work areas of the robots may overlap each other. However, collisions between the robots are prohibited by controlling the movements of the robots appropriately.

Figure 3:
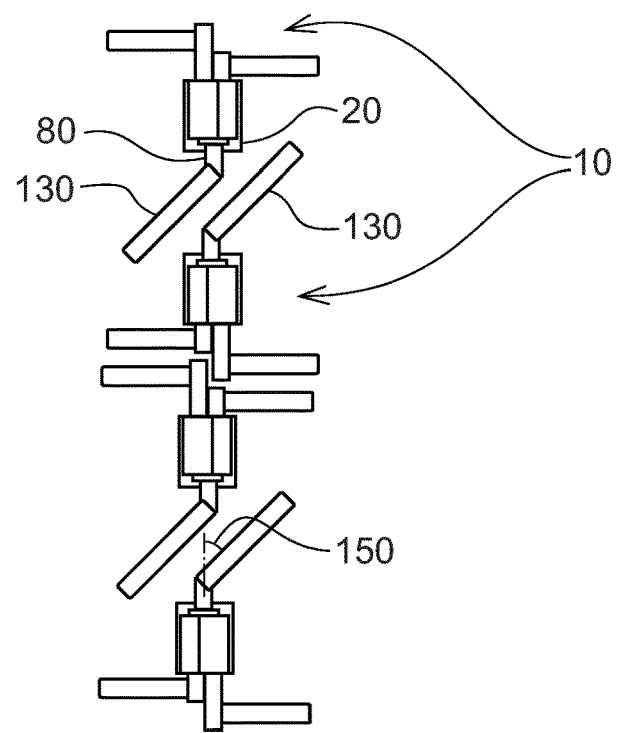
FIG. 3 shows one embodiment of the invention.
Figure 4A:
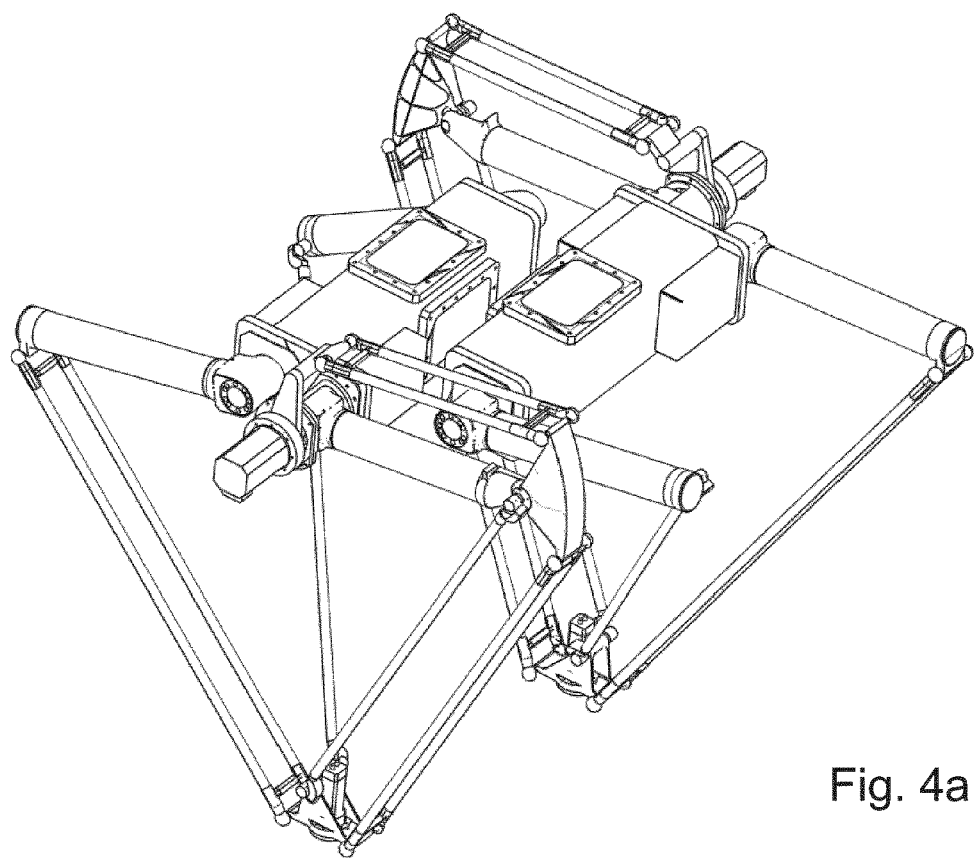
FIGS. 4a-4b show two robots corresponding to the embodiment of FIG. 2.
Figure 4B:
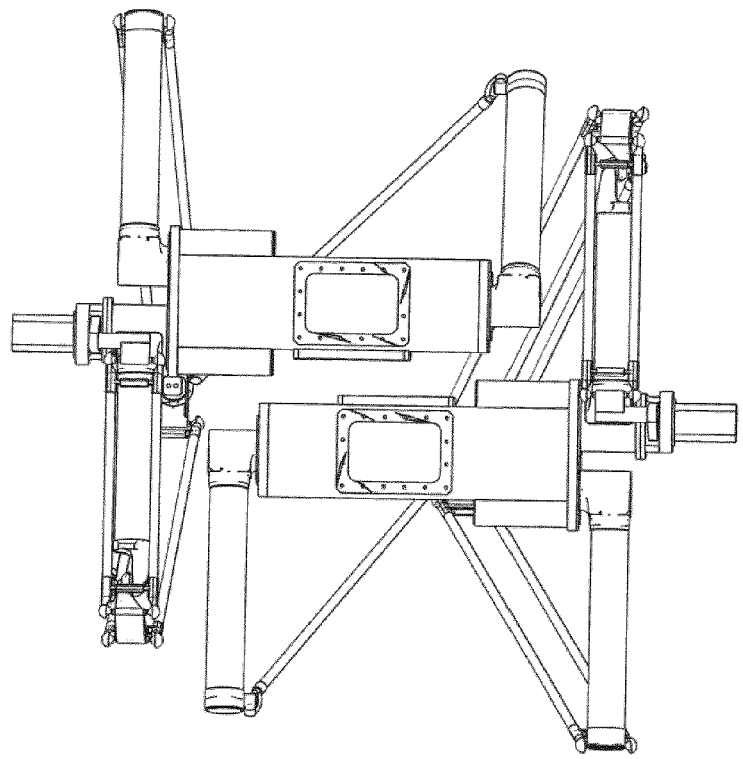

Referring to FIG. 3, according to one embodiment of the invention the third drive arm 130 is inclined by 45 degrees in relation to the third shaft 80 i.e. there is an inclination angle 150 with a value of 45 degrees between these two elements. By doing this the frame 20 can be made much shorter compared with embodiments where the third drive arm 130 is perpendicular to the third shaft 80 i.e. where the inclination angle 150 has a value of 90 degrees. Because of the inclination the distal end of the third drive arm 130, i.e. the end not attached to the third shaft 80, follows the same trajectory as the corresponding distal end of the embodiment according to FIGS. 1 and 2. Consequently, the embodiment of FIG. 3 is identical with that of FIGS. 1 and 2 from the kinematics point of view. However, as illustrated in FIG. 3, robots 10 with non-perpendicular third drive arms 130 can be installed more compactly in relation to each other.

As before, it is to be understood that the collision of two neighbouring third drive arms 130 can be easily avoided by appropriate control of the robots 10, but for the purpose of defining the present invention they shall be considered to be within the reach of each other as the physical dimensions of the installation enable a collision. It is furthermore possible to incline the first and second drive arms 110, 120 such as to make them non-perpendicular with the respective first and second shafts 60, 70 whenever feasible. The inclination angles 150 are by no means limited to 90 or 45 degrees but can be anything between 90 and about 30 degrees.

The invention is not limited to the embodiments shown above, but the person skilled in the art may modify them in a plurality of ways within the scope of the invention as defined by the claims.

The invention claimed is:

1. A robot installation, comprising:
   a first robot and a second robot, each of the robots comprising:
      a first shaft and a second shaft extending in a first direction from respective first and second actuators;
      a third shaft extending in a second direction from a respective third actuator, the second direction being opposite to the first direction;
      a frame defining fixed positions of the first, second and third shafts in relation to each other;
      a first drive arm attached to the first shaft;
      a second drive arm attached to the second shaft; and
      a third drive arm attached to the third shaft;
      a first rod attached to a distal end of the first drive arm;
      a second rod attached to a distal end of the second drive arm;
      a third rod attached to a distal end of the third drive arm;
      an end effector attached to the respective distal ends of the first rod, the second rod, and the third rod;
   wherein the first robot is attached to a fixed position in relation to the second robot such that the frame of the second robot lies within a reach of at least one drive arm of the first robot.

2. The robot installation according to claim 1, wherein the first and the second robots are identical.

3. The robot installation according to claim 1, wherein the robot installation comprises at least three robots, and wherein each robot is attached to a fixed position in relation to the remaining robots such that the frame of each robot lies within a reach of at least one drive arm of the remaining robots.

4. The robot installation according to claim 1, wherein the third drive arm is not perpendicular to the third shaft.

5. The robot installation according to claim 4, wherein the third drive arm is inclined by 45 degrees in relation to the third shaft.

6. The robot installation according to claim 1, wherein the first robot is attached to a fixed position in relation to the second robot such that the frame of the second robot lies within a reach of the third drive arm of the first robot.

7. The robot installation according to claim 1, wherein the second direction is opposite and parallel to the first direction.

8. The robot installation according to claim 1, wherein the first drive arm rotates along with the first shaft about a first rotation axis, the second drive arm rotates along with the second shaft about a second rotation axis, and the third drive arm rotates along with the third shaft about a third rotation axis.

9. The robot installation according to claim 1, wherein the frame of the second robot lies within a reach of the third drive arm of the first robot.

10. The robot installation according to claim 1, wherein the first drive arm is disposed at a fixed angle relative to the first shaft;
   wherein the second drive arm is disposed at a fixed angle relative to the second shaft; and
   wherein the third drive arm is disposed at a fixed angle relative to the third shaft.

11. The robot installation according to claim 1, wherein the first rod is attached to the distal end of the first drive arm via a first ball joint;

wherein the second rod is attached to the distal end of the second drive arm via a second ball joint; and wherein the third rod is attached to the distal end of the third drive arm via a third ball joint.

12. A robot installation, comprising:
a first robot and a second robot, each of the robots comprising:
- a first shaft and a second shaft extending in a first direction from respective first and second actuators;
- a third shaft extending in a second direction from a respective third actuator, the second direction being opposite to the first direction;
- a frame defining fixed positions of the first, second and third shafts in relation to each other;
- a first drive arm attached to the first shaft;
- a second drive arm attached to the second shaft; and
- a third drive arm attached to the third shaft;
- a first rod attached to a distal end of the first drive arm;
- a second rod attached to a distal end of the second drive arm;
- a third rod attached to a distal end of the third drive arm;
- an end effector attached to the respective distal ends of the first rod, the second rod, and the third rod;
- wherein the first drive arm rotates along with the first shaft about a first rotation axis, the second drive arm rotates along with the second shaft about a second rotation axis, and the third drive arm rotates along with the third shaft about a third rotation axis; and
- wherein the first drive arm remains perpendicular to the first shaft as the first drive arm rotates along with the first shaft about the first rotation axis, and the second drive arm remains perpendicular to the second shaft as the second drive arm rotates along with the second shaft about the second rotation axis;

wherein the first robot is attached to a fixed position in relation to the second robot such that the frame or at least one of the first drive arm, the second drive arm, and the third drive arm of the second robot lies within a reach of at least one drive arm of the first robot.

13. A robot installation, comprising:
a first robot and a second robot, each of the robots comprising:
- a first shaft and a second shaft extending in a first direction from respective first and second actuators;
- a third shaft extending in a second direction from a respective third actuator, the second direction being opposite to the first direction;
- a frame defining fixed positions of the first, second and third shafts in relation to each other;
- a first drive arm attached to the first shaft;
- a second drive arm attached to the second shaft; and
- a third drive arm attached to the third shaft;
- a first rod attached to a distal end of the first drive arm;
- a second rod attached to a distal end of the second drive arm;
- a third rod attached to a distal end of the third drive arm;
- an end effector attached to the respective distal ends of the first rod, the second rod, and the third rod;
- wherein the first drive arm rotates along with the first shaft about a first rotation axis, the second drive arm rotates along with the second shaft about a second rotation axis, and the third drive arm rotates along with the third shaft about a third rotation axis; and
- wherein the first rotation axis is offset relative to the second rotation axis;

wherein the first robot is attached to a fixed position in relation to the second robot such that the frame or at least one of the first drive arm, the second drive arm, and the third drive arm of the second robot lies within a reach of at least one drive arm of the first robot.

14. The robot installation according to claim 13, wherein the first rotation axis extends parallel relative to the second rotation axis.

* * * * *